3,758,511
Patented Sept. 11, 1973

3,758,511
PREPARATION OF d,l-ZEARALENONES
Norman L. Wendler, Summit, David Taub, Metuchen, and Narindar Nath Girotra, Rahway, N.J., assignors to Merck & Co., Inc., Rahway, N.J.
No Drawing. Original application Jan. 18, 1967, Ser. No. 609,995, now Patent No. 3,624,144. Divided and this application June 5, 1970, Ser. No. 57,392
Int. Cl. C07d 9/00
U.S. Cl. 260—343.2 F                                6 Claims

ABSTRACT OF THE DISCLOSURE d,l-Zearalenone and mono- and di-ethers thereof, compounds havng anabolic, esterogenic and fertility control properties, are prepared by a total chemical synthesis. An aromatic ring component, a diether of 2-formyl-4,6-dihydroxy benzoic acid, is prepared by selective reduction of a diether of 3,5-dihydroxy phthalic anhydride; an aliphatic component, 2 - loweralkoxy-6-methyltetrahydropyran-2-butyl triphenyl phosphonium halide, is prepared via a sequence of reactions involving the condensation of 2-hydroxyhexanoic acid -δ-lactone with pent-4-enyl magnesium bromide, subsequent treatment with alcoholic acid to form 2-(pent-4-enyl)-2-loweralkoxy-6-methyl tetrahydropyran, which substance is in turn ozonized, reduced with alkali metal borohydride, reacted with an alkyl or aryl sulfonyl halide, and then with sodium bromide or iodide to afford 2-(δ-halobutyl)-2-loweralkoxy-6-methyl tetrahydropyran, which latter substance is reacted with tri-aryl phosphine to afford the above-stated aliphatic component. The aromatic and aliphatic components are coupled and the resulting 1-(3,5-diether-6-carboxyphenyl)-10-hydroxy-1-undecen-6-one ring-closed with trifluoroacetic anhydride to yield d,l-zearalenone di-ether, which is cleaved with boron tribromide or pyridine hydrochloride to d,l-zearalenone.

CROSS REFERENCES TO RELATED APPLICATIONS

This case is a divisional application of U.S. Ser. No. 609,995, filed Jan. 18, 1967, now U.S. Pat. 3,624,144.

BACKGROUND OF THE INVENTION

The optically active form of 6-(10-hydroxy-6-oxotrans-1-undecenyl)-β-resorcylic acid -μ-lactone has been prepared by fermentation as described in U.S. Pat. No. 3,196,019, and this substance is now known as zearalenone. It has the structural formula:

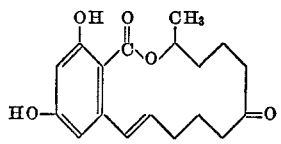

Heretofore it has been obtainable only via fermentation. It is the purpose of this invention to provide for the first time a total chemical synthesis of d,l-zearalenone as well as of certain mono- and di-ethers thereof.

SUMMARY

This invention relates to the novel compound d,l-zearalenone. It relates further to mono- and di-ethers thereof, and to the total chemical synthesis of these materials by a process that comprises elaboration of the aromatic ring component of d,l-zearalenone diether, separate elaboration of an appropriate aliphatic component, and finally coupling of these two substances followed by ring closure of the acid produced on said coupling. The invention also relates to the novel compounds obtained and useful as intermediates in this total synthesis, and to processes for making such intermediates. d,l-Zearalenone, and the ethers thereof, described hereinafter are valuable compounds in that they possess the anabolic and estrogenic activity and also the fertility control properties of zearalenone produced by fermentation. They are also useful as intermediates in making other compounds having such biological activity, as for example by reduction of the aliphatic double bond and/or the carbonyl moiety of d,l-zearalenone. Formation of such substances from fermentation-derived zearalenone has been described in the art.

The over-all process which we have employed for the total chemical synthesis of d,l-zearalenone may be pictured structurally as follows:

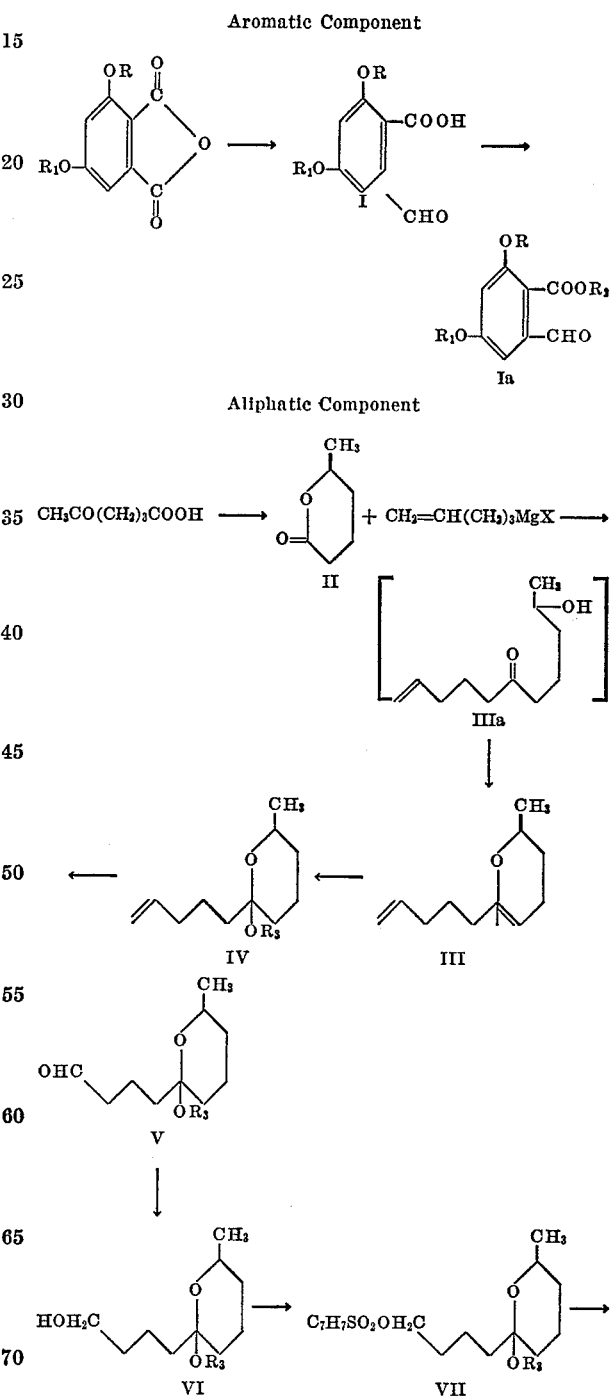

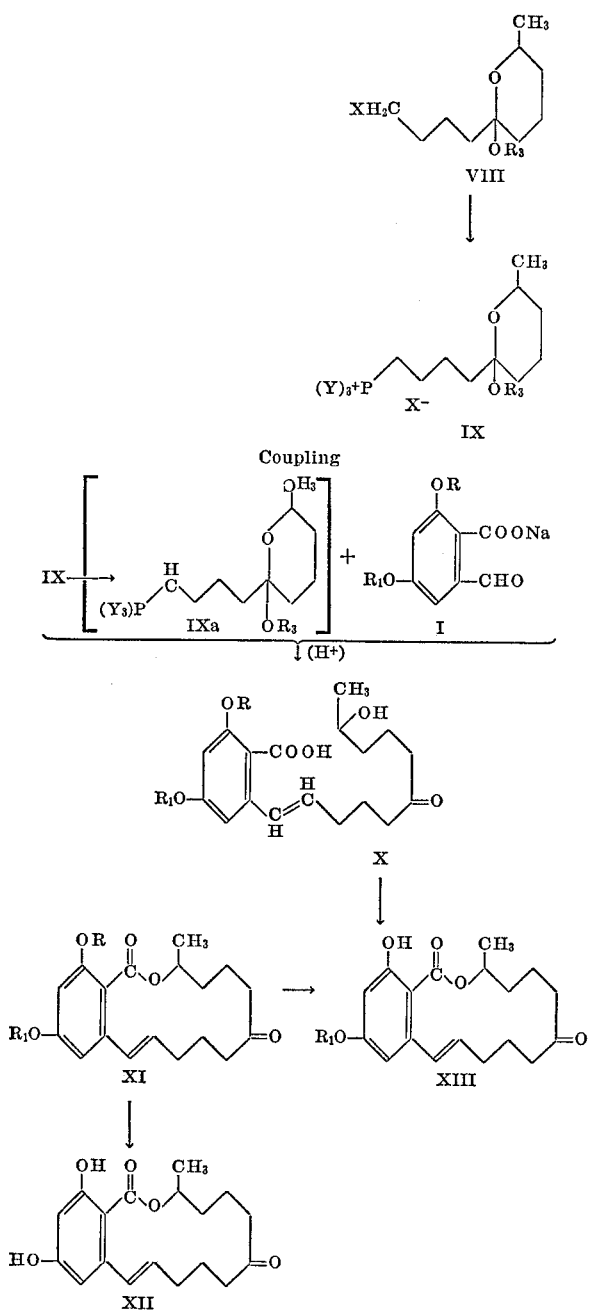

In the above flowsheet the symbols R and $R_1$ represent benzyl, a straight chain loweralkyl radical such as methyl, ethyl, n-propyl or butyl, methoxymethyl or tetrahydropyranyl; $R_2$ represents a loweralkyl radical examples of which are methyl, ethyl, propyl, butyl and isopropyl; $R_3$ represents loweralkyl, examples being methyl, ethyl, or propyl; X represents bromo or iodo and Y represents aryl such as phenyl, tolyl, and the like, or loweralkoxy such as methyl, ethyl or butyl.

Aromatic component: In accordance with the first stage of our process, 2-formyl-4,6-dialkoxy benzoic acid, 2-formyl-4,6-dibenzyloxy benzoic acid, 2-formyl-4,6-di-tetrahydropyranyloxy or 2-formyl-4,6-dimethoxymethoxy benzoic acid (I) is produced by the selective reduction of the corresponding diether of 3,5-dihydroxy phthalic anhydride. For this conversion of the phthalic anhydride to the substituted benzoic acid we employ as reducing agent either a deactivated lithium aluminum hydride such as an alkoxy lithium aluminum hydride, or catalytic hydrogenation with platinum oxide catalyst. It is preferred to use the alkoxy aluminum hydride, examples of which are lithium tri-t-butoxy aluminum hydride, lithium tri-isopropoxy aluminum hydride or lithium tri-sec-amyloxy aluminum hydride. The process is brought about under anhydrous conditions in a solvent such as tetrahydrofuran, ether, dioxane or mixtures of tetrahydrofuran-benzene. Alcoholic solvents should be avoided. For best results it is desirable to carry out the process by adding one equivalent of the reducing agent to the 2,4-disubstituted phthalic anhydride at temperatures of from about 5 to 20° C. The reaction mixture may then be warmed to room temperature or slightly above and the desired ether of 2-formyl-4,6-dihydroxy benzoic acid (I) recovered by extraction techniques known to those skilled in this art.

The catalytic reduction process using platinum catalyst is brought about in a neutral solvent such as ethyl acetate until the desired amount of hydrogen is consumed. This may be carried out at room temperature for periods of time from about 5 to 20 hours.

It is preferred to prepare as this intermediate in our process 2-formyl-4,6-dimethoxy benzoic acid, although other diethers such as the diethyl, dipropyl, dibenzyl, di-tetrahydropyranyl or dimethoxymethyl ethers may be used if desired. Certain of the diethers of 3,5-dihydroxy phthalic anhydride used as starting materials in this process are known; those that are not specifically described in the prior art are made by similar processes using the appropriate etherifying agent.

The 2-formyl-4,6-disubstituted benzoic acid of Formula I above may be esterified by treatment with a diazoloweralkane such as diazomethane or diazoethane. This is brought about by passing the diazoalkane through a solution of the 2-formyl-4-$OR_1$-6-OR-benzoic acid (where R and $R_1$ are as previously defined) in a suitably inert solvent such as tetrahdyrofuran or dioxane. Excess diazomethane is removed and the desired ester obtained by evaporation of the reaction solvent.

Aliphatic component: According to this aspect of our invention, 2-loweralkoxy - 6 - methyl-tetrahydropyran-2-butyl-triaryl (or trialkoxy) phosphonium bromide or iodide (IX) is produced via a sequence of reactions beginning with the known 4-acetyl butyric acid. In the first step of this sequence, 4-acetyl butyric acid is treated with alkali metal borohydride and then with mineral acid to afford 2-hydroxyhexanoic acid-δ-lactone (II). The alkali metal borohydride reaction is brought about in the presence of a weak base such as an alkali metal bicarbonate at about room temperature for from 1 to 6 hours. The mixture is then made acidic with a mineral acid, e.g. a hydrohalic acid, in order to form the cyclic lactone. It will be appreciated by those skilled in this art that this lactone is a racemate and, therefore, that the ensuing intermediates in our total synthesis will exist in the optically inactive d,l-form.

In the next step of our process, the 2-hydroxy hexanoic acid-δ-lactone is reacted with the Grignard reagent pent-4-enyl magnesium bromide to afford 2-(pent-4-enyl)-6-methyl-Δ²-di-hydropyran (III). In order to achieve optimum results in this reaction, we employ essentially equimolar amounts of the hexanoic acid lactone and the Grignard reagent, and effect the reaction by adding the Grignard reagent to the lactone. The immediate reaction product is primarily the open-chain compound 10-hydroxy-1-undecen-6-one (IIIa) which is converted without isolation to the desired cyclic Compound III by distillation in vacuo. It is desirable that a trace amount of acid be present during the distillation as a catalyst and it has been found that the acidity of ammonium chloride is sufficient for this purpose.

The dihydropyran III is next converted to 2-(pent-4-enyl)-2-loweralkoxy-6-methyl tetrahydropyran (IV) by treatment with a loweralkanol in the presence of acid. It will be appreciated that the alkoxy group at the 2-position corresponds to the particular alkanol employed in the process. It is preferred to use methanol with consequent formation of the 2-methoxy tetrahydropyran (IV where $R_3$ represents methyl). Inasmuch as the methoxy compound is a preferred embodiment of the invention and for the sake of convenience, reference will frequently be made in the ensuing description to the 2-methoxy tetrahydropyran compounds, but it should be understood that this is not to be construed as a limitation of the invention which includes within its scope other 2-loweralkoxy tetrahydropyran compounds. The particular acid necessary for the preparation of Compound IV is not critical and may be a non-oxidizing mineral acid such as hydrochloric, sulfuric, or p-toluene sulfonic acid. Hydrochloric acid is preferred. The reaction is carried out at about room temperature for from 1 to 6 hours under essentially anhydrous conditions and the desired product then recovered from the reaction mixture by known methods. When primary alcohols such as ethanol, n-propanol or butanol are utilized in place of methanol, the corresponding 2-ethoxy, 2-n-propoxy and 2-butoxy compounds of Formula IV are produced.

The olefin obtained as described immediately above is next converted to 2 - loweralkoxy-6-methyl tetrahydropyran-2-butyraldehyde (V) by reaction with ozone and decomposition of the resulting ozonide. The ozonization is brought about in the cold, i.e. at temperatures of about —70° C. to —30° C. using an excess of ozone. When the reaction is complete, the aldehyde V may be recovered by decomposing the ozonide with a mild reducing agent such as dimethyl sulfide or a palladium catalyst, and isolating the product by known techniques. Representative compounds which may be prepared in this fashion are 2-methoxy- (or 2-ethoxy, 2-n-propoxy or 2-butoxy) 6-methyl-tetrahydropyran-2-butyraldehyde, (V).

When the aldehyde is to be used directly in the next step of our process, it is unnecessary to isolate or purify it, and in fact it is a preferred embodiment of the invention to treat the aforementioned ozonide directly with an alkali metal borohydride such as sodium borohydride in a loweralkanolic solvent to produce the carbinol 2-(δ-hydroxybutyl)-2-loweralkoxy - 6 - methyl tetrahydropyran (VI). The borohydride reduction, in which the ozonide is decomposed and the aldehyde reduced, is preferably initiated in the cold and carried out at temperatures of about 20–40° C. for from ½ to 3 hours. The solvent is then removed and the desired product isolated from the residue by standard extraction techniques. The reduction of the aldehyde (V) to the carbinol VI may also be brought about with other reducing agents such as lithium aluminum hydride in an ethereal solvent, or by catalytic hydrogenation in a neutral solvent using a platinum catalyst. In this manner there is produced 2-(δ-hydroxybutyl)-2-methoxy- (or 2-ethoxy or 2-propoxy) 6-methyl-tetrahydropyran (VI).

In carrying out the above reduction, it is desirable to maintain the reaction mixture free of aqueous acid to assure maximum formation of the carbinol VI. In the presence of aqueous acid the spiro compound 1,7-di-oxa-2-methyl spiro[5:5]-undecane (VIa) is produced in preference to the open chain carbinol:

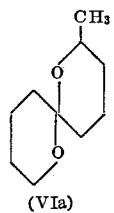

(VIa)

This substance is also obtained by treatment of 2-(δ-hydroxybutyl)-2-loweralkoxy-6-methyl tetrahydropyran VI with aqueous alcoholic mineral acid such as aqueous methanolic hydrochloric acid. The spiro compound may also serve as an intermediate in our process since it is transformed to the carbinol VI by treatment with dry alcoholic hydrogen halide such as anhydrous methanolic hydrogen chloride.

The carbinol VI is next reacted with an appropriate alkyl or aryl sulfonyl halide in the presence of an acid binding agent to produce 2-(δ-aryl or alkyl sulfonyloxy)-2-loweralkoxy-6-methyl tetrahydropyran (VII). It is preferred to utilize p-toluene sulfonyl chloride as the reagent in this step of our process thereby forming the p-toluene sulfonyloxy derivative, but other alkyl and aryl sulfonyl halides such as methane sulfonyl chloride, ethane sulfonyl chloride and benzene sulfonyl chloride may be used if desired. It is also convenient and preferred to bring the reaction about in a basic solvent such as pyridine or one of the picolines which also serves as an acid binding agent. The reaction is initiated at temperatures of about 0–10° C. and allowed to proceed in the cold for from 4–20 hours. Examples of compounds obtained in this way are the 2-(δ-p-toluenesulfonyloxy)-2-methoxy-6-methyl tetrahydropyran, 2-(δ-benzenesulfonyloxy)-2-ethoxy-6-methyl tetrahydropyran, and 2-(δ-methanesulfonyloxy) - 2 - n-propoxy-6-methyl tetrahydropyran.

The tetrahydropyran VII obtained as described above is occasionally found to contain small amounts of the enol ether and hydroxy ketone forms of the product. These are reconverted to the tetrahydropyran form by mild treatment with dilute anhydrous alcoholic mineral acid. It is convenient and preferred to employ dilute methanolic hydrogen chloride for this purpose when the 2-loweralkoxy substituent is methoxy.

It should be noted at this point that the novel tetrahydropyrans of our invention are susceptible during reaction to ring opening, but that they are readily reconverted to the desired tetrahydropyran form with anhydrous loweralkanolic hydrogen halide. The alcohol should be the one corresponding to the loweralkoxy substituent of the tetrahydropyran in order to preclude formation of mixtures and/or complete interchange of the alkyl moiety of the alcohol and the alkyl moiety $R_3$. As the hydrogen halide, it is preferred to use hydrogen chloride, although in those cases where the tetrahydropyran contains a halogen, such as in Compound VIII, the corresponding hydrogen halide is employed.

According to the next step of our total chemical synthesis of d,l-zearalenone, the sulfonyloxy Compound VII is reacted with an alkali metal bromide or iodide to afford the 2-(δ-bromobutyl)-2-loweralkoxy-6-methyl tetrahydropyran or 2-(δ-iodobutyl)-2-loweralkoxy-6-methyl tetrahydropyran (VIII). This reaction is carried out by heating the tetrahydropyran VII with an alkali metal halide in a loweralkanol for from 2 to 10 hours, using temperatures of from about 50–125° C. It is preferred to employ sodium bromide in methanol as solvent. Upon completion of the reaction and removal of the solvent, the oil thus obtained is treated briefly with loweralkanolic hydrogen bromide in order to insure that all of the product is in the tetrahydropyran form. Examples of compounds obtained in this way are 2-(δ-bromobutyl)-2-methoxy-6-methyl tetrahydropyran, 2-(δ-bromobutyl)-2-ethoxy - 6-methyl tetrahydropyran, and 2-(δ-iodobutyl)-2-n-propoxy-6-methyl tetrahydropyran.

The final reaction for elaborating the aliphatic component for our total synthesis comprises formation of 2-loweralkoxy-6-methyl tetrahydropyran-2-butyl tri - aryl phosphonium halide or 2-loweralkoxy-6-methyl-tetrahydropyran-2-butyl-tri-alkoxy phosphonium halide (IX) by the reaction of Compound VIII with a tri-aryl or tri-alkoxy phosphine in a suitable solvent at temperatures of between about 50° and 100° C. It is convenient to employ a loweralkanol such as methanol or ethanol for this reaction. Although tri-phenyl phosphine is preferred, other tri-aryl phosphines and tri-alkoxy phosphines such as tri-ethoxy phosphine and tri-methoxy phosphine may be utilized as well. At the end of the reaction the volume of the reaction mixture is reduced and the pohsphonium salt precipitated with benzene or toluene. The product may contain a minor amount of the open-ring hydroxy ketone form and, when this occurs, it is conveniently reconverted to the desired tetrahydropyran form (IX) by treatment with dilute alkanolic hydrogen halide, and preferably dilute methanolic hydrogen bromide. When the starting material for this reaction is an iodobutyl tetrahydropyran, the resulting phosphonium salt will, of course, be an iodide. Representative examples of these intermediates are 2-methoxy-6-methyl-tetrahydropyran-2-butyl triphenyl phosphonium bromide, 2 - ethoxy-6-methyl-tetrahydropyran-2-butyl triphenyl phosphonium iodide, and 2-n-propoxy-6-methyl-tetrahydropyran - 2 - butyl triethoxy phosphonium bromide. Compound IX is considered as the aliphatic component of our total synthesis and it is this substance which is reacted with the substituted benzoic acid I in the final sequence of reactions leading to d,l-zearalenone (XII).

Condensation: In the final step of our total synthesis the 2-loweralkoxy-6-methyl tetrahydropyran-2-butyl triaryl (or trialkoxy) phosphonium halide (Compound IX) is first treated with methyl sulfinyl carbanion (generated from dimethylsulfoxide and alkali metal hydride) in order to form the corresponding phosphorane. This substance is also sometimes referred to as the ylid. This phosphorane in solution is reacted with an alkali metal salt of 2-formyl-4-$OR_1$-6-OR benzoic acid (wheer R and $R_1$ are as previously defined). The immediate reaction product is an alkali metal salt of 2-[δ-(2-carboxy-3-OR-5-$OR_1$-benzylidene)]-butyl - 2 - loweralkoxy - 6 - methyl tetrahydropyran of Formula Xa:

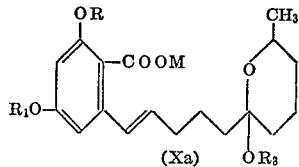

(Xa)

where M represents alkali metal, and R, $R_1$ and $R_3$ are as previously defined. In the preferred embodiment of the invention, M is sodium, and R, $R_1$ and $R_3$ represent methyl.

This substance is then acidified, without isolation, to afford 1-(3-$OR_1$-5-OR-6-carboxyphenyl) - 10 - hydroxy-1-undecen-6-one (X). Although it is theoretically possible with this reaction to form the cis and/or trans geometrical isomers because of the aliphatic double bond, our process affords predominantly the desired trans-isomer. Compound X is conveniently referred to as the seco acid derived from zearalenone di-ether. Examples of the ether substituents which may be present in Compound X are methoxy, ethoxy, methoxymethoxy and tetrahydropyranyloxy.

This acid (X) is also obtained from zearalenone dimethyl ether by reaction of the latter compound with alkali metal hydroxide in the presence of dimethyl sulfoxide, the reaction being carried out at about 75–150° C. for from 1 to 3 hours. d,l-Seco acid is obtained in this process even in those cases where the starting material is optically pure.

The loweralkyl esters of the seco acid (X) are prepared by reaction of the free acid with an excess of diazoloweralkane for about 15 to 60 minutes at about room temperature. The resulting ester is then isolated by removal of the solvent and excess diazoalkane, and purified by known techniques.

In accordance with the next step of our invention, the di-ether of d,l-zearalenone (XI) is prepared by treating the seco acid (X) with a ring closing agent such as trifluoroacetic anhydride or dicyclohexylcarbodiimide. Trifluoroacetic anhydride is the preferred reagent and with it the desired conversion of Compound X to Compound XI is brought about in the cold in a suitable solvent such as benzene, toluene or xylene. Upon completion of the reaction, which normally takes from about ½ to 3 hours, the mixture is made basic and the desired d,l-zearalenone di-ether conveniently extracted into a nonpolar solvent such as benzene or toluene, and recovered and purified therefrom by known chemical techniques. In this regard, it has been found quite satisfactory to achieve the final purification by chromatography on an adsorbent such as silica gel or alumina. In this manner there are prepared compounds such as d,l-zearalenone dimethyl ether, d,l-zearalenone diethyl ether, d,l-zearalenone dibenzyl ether, d,l-zearalenone dimethoxymethyl ether, and d,l-zearalenone di-tetrahydropyranyl ether.

The final step in our synthesis of d,l-zearalenone itself is accomplished by cleaving the diether (XI) with boron tribromide or, alternatively, with pyridine hydrochloride. The boron tribromide reaction is a rapid one and the ether cleavage is substantially complete in a matter of minutes at temperatures of from about −10° C. to about +15° C. Removal of the solvent affords crude product which may be purified directly by crystallization from a solvent such as nitromethane, or by chromatography on an adsorbent such as silica gel, followed by crystallization from a suitable organic solvent.

When pyridine hydrochloride is employed as the ether cleaving agent, the reaction is carried out at elevated temperatures of about 125–200° C., and the resulting product extracted and purified in the same manner as described immediately above.

Our invention also provide a method for synthesizing the 4-monoethers of d,l-zearalenone by selective cleavage of the diether (XI). This is effected with either boron tribromide or boron trichloride. The cleavage of the ether radical at the 2-position is essentially instantaneous and when production of the 4-monoether is desired, the d,l-zearalenone diether is contacted only momentarily with the boron trihalide, i.e. for preferably less than one minute. The monoether is isolated and purified in essentially the same way as described above for purifying d,l-zearalenone itself.

As previously indicated, d,l-zearalenone and the ether derivatives thereof (Compounds XI, XII, and XIII) have growth promoting activity in animals as well as estrogenic and uterotrophic activity.

The following examples are given for the purpose of illustration and not by way of limitation.

EXAMPLE 1

2-formyl-4,6-dimethoxybenzoic acid (I)

To a stirred, cooled solution of 4.16 g. of 2,4-dimethoxyphthalic anhydride in 60 ml. of anhydrous tetrahydrofuran at 10° C. there is added over 30 minutes a solution of 5.10 g. of lithium tri t-butoxy aluminum hydride in 60 ml. of tetrahydrofuran. The cooling bath is removed and the mixture is stirred for 18 hours at room temperature. The mixture is then cooled to 10–15° C. and 15 ml. of saturated aqueous sodium sulfate is added over a 5 minute period. Dilute hydrochloric acid is added and the mixture is extracted with ethyl acetate. The ethyl acetate extracts are combined, dried over magnesium sulfate and concentrated to dryness to yield a semi-crystalline residue. Crystallization of the residue from acetone-ether yields 2-formyl-4,6-dimethoxybenzoic acid, M.P. 193–196° C.

2-formyl-4,6-diethoxybenzoic acid and 2-formyl-4,6-dibenzyloxybenzoic acid are obtained by repeating the above experiment with 2,4-diethoxy or 2,4-dibenzyloxyphthalic anhydride.

The 2,4-dimethoxyphthalic anhydride used as starting material in this experiment is a known compound. Other 2,4-di-loweralkoxyphthalic anhydrides, such as the 2,4-diethoxy and di-n-propoxy ethers, and 2,4-diaralkoxyphthalic anhydrides, such as the 2,4-dibenzyloxy ether, are made in similar fashion as the 2,4-dimethyl ether with the appropriate etherifying agents. Alternatively, they may be obtained by cleaving the dimethyl ether with acid to 2,4-dihydroxyphthalic anhydride and etherifying by known methods.

(B) 2-formyl-4,6-dimethoxybenzoic acid 4,6-dimethoxyphthalic anhydride (832.6 mg.) is hydrogenated at 25° C. under 50 p.s.i. of pressure in 170 ml. of ethyl acetate, employing 278 mg. of platinum oxide as catalyst, for 18 hours. The catalyst is removed by filtration and the filtrate is concentrated in vacuo to a solid residue. The residue is extracted with benzene, filtered and the benzene solution diluted with ethyl acetate until the solvent ratio is about 1:1, and then extracted with 5% aqueous sodium bicarbonate solution. The alkaline solution is then acidified with 2.5 N hydrochloric acid and extracted with chloroform. The organic phase is washed with water, dried over magnesium sulfate and concentrated in vacuo to give pure crystalline 2-formyl-4,6-dimethoxybenzoic acid.

(C) Methyl 2-formyl-4,6-dimethoxybenzoate

Diazomethane is generated by the procedure of DeBoer [Rec. Trav. Chim 73 229 (1954)] and under a genttle stream of nitrogen excess diazomethane is passed into a solution of 400 mg. of 2-formyl-4,6-dimethoxybenzoic acid in 10 ml. of tetrahydrofuran. After 30 minutes the excess diazomethane and solvent are removed under vacuum. The crystalline residue is crystallized from acetoneether to gvie pure methyl 2-formyl-4,6-dimethoxybenzoate, M.P. 85–87° C.

Other lower alkyl esters, such as the ethyl, n-propyl and butyl esters are obtained by treating 2-formyl-4,6-dimethoxybenzoic acid with the appropriate diazoalkane using the above procedure. Similarly, methyl 2-formyl-4,6-dibenzyloxybenzoate and ethyl 2-form-4,6-diethoxybenzoate are produced by reaction of 2-formyl-4,6-dibenzyloxybenzoic acid with diazomethane and reaction of 2-formyl-4,6-diethoxybenzoic acid with diazoethane.

EXAMPLE 2

2-hydroxyhexanoic acid-δ-lactone (II)

To a stirred solution of 13.014 g. (0.1 mole) of 4-acetylbutyric acid in 80 ml. of water containing 10.082 g. (0.12 mole) of sodium bicarbonate there is added portionwise at 0° C. 1.89 g. (0.05 mole) of sodium borohydride. The resulting reaction mixture is stirred at ca. 25° C., for 4 hours and then made acidic with hydrochloric acid to pH 2. The mixture is allowed to stand for 19 hours at room temperature, and then is saturated with sodium chloride and extracted with diethyl ether. The ether extract is washed twice with saturated sodium chloride solution and dried over anhydrous sodium sulfate. The ether solution is evaporated to a residue, and the residue distilled in vacuo to afford 9.5 g. of 2-hydroxyhexanoic acid-δ-lactone, B.P. 112–113° C./21 mm.

EXAMPLE 3

2-(pent-4-enyl)-6-methyl-Δ$^2$-dihydropyran (III)

To a stirred suspension of 7.296 g. (0.2968 mole) of activated magnesium in 40 ml. of dry ether there is added a solution of 35.397 g. (0.2375 mole) of 1-bromo-4-pentene in 90 ml. of dry ether under an atmosphere of nitrogen. This is accomplished by first adding a small amount of the bromo compound and heating the mixture to reflux in order to initiate the reaction. The remaining amount of bromopentene is added at a rate such that the reaction mixture refluxes without an external source of heat. After the addition is complete (1⅓ hours), the reaction mixture is refluxed for an additional 40 minutes and then cooled to room temperature. The 4-pentenyl magnesium bromide Grignard reagent thus prepared is added dropwise to a stirred solution of 27.108 g. (0.2375 mole) of 2-hydroxyhexanoic acid-δ-lactone in 300 ml. of dry ether at −15° C. over a 2 hour period and under an atmosphere of nitrogen. The resulting heterogenous reaction mixture is stirred at −10° C. for 30 minutes and then treated with a saturated aqueous solution of ammonium chloride. The aqueous layer is extracted with ether. The ether solution and extracts are combined and extracted with 5% aqueous sodium hydroxide in order to remove any unreacted lactone. The ether solution is then washed successively with water, saturated ammonium chloride and saturated sodium chloride. It is then dried over anhydrous sodium sulfate, and the ether removed by evaporation in vacuo. The residue, which contains a large proportion of 10-hydroxy-1-undecen-6-one, is distilled in vacuo to afford 20.363 g. (51.5%) of 2-(pent-4-enyl)-6-methyl-Δ$^2$-dihydropyran, B.P. 52–54° C./0.65 mm.

Brief treatment of 2-(4′-pentenyl)-6-methyl-Δ$^2$-dihydropyran with aqeuous hydrochloric acid affords the open chain compound 10-hydroxy-1-undecen-6-one (IIIa), I.R.: $\lambda_{max.}^{film}$ 3.02, 5.88μ

EXAMPLE 4

2-(pent-4-enyl)-2-methoxy-6-methyl tetrahydropyran (IV)

40 ml. of 1% HCl-methanol solution is added, with stirring to 15.3 g. of 2-(pent-4-enyl)-6-methyl-Δ$^2$-dihydropyran at 0° C. With the first addition of about 1 ml. of 1% HCl-methanol the temperature of the reaction mixture rises to about 50° C. It is cooled to 25° C. and the rest of the methanolic hydrogen chloride is added at that temperature. The mixture is stirred for 3½ hours, and then an excess of solid sodium bicarbonate is added to it. It is stirred for 15 minutes at room temperature and the reaction mixture then filtered to remove the solids. The filtrate is evaporated to a residue at 30 C. under vacuum. A small volume of ether is added, the mixture filtered, and the filtrate distilled in vacuo to give 2-(pent-4-enyl)-2-methoxy-6-methyl tetrahydropyran as a colorless oil, B.P. 57–59° C./0.65 mm.

When ethanolic hydrogen chloride is employed in the above reaction in place of methanolic hydrogen chloride, 2-(pent-4-enyl)-2-ethoxy-6-methyl tetrahydropyran is obtained.

EXAMPLE 5

2-methoxy-6-methyl tetrahydropyran-2-butyraldehyde (V)

A solution of 9.915 g. of 2-(pent-4-enyl)-2-methoxy-6-methyl tetrahydropyran in 100 ml. of dry methanol is treated with a steady stream of 3% ozone at −70° C. until the effluent gas turns starch-potassium iodide indicator blue. Addition of ozone is then stopped and excess ozone removed by bubbling nitrogen through the reaction mixture. This mixture contains the ozonide of 2-methoxy-6-methyl tetrahydropyran-2-butryaldehyde, which may be used directly without isolation or further purification in the next step of the process.

In order to isolate 2-methoxy-6-methyl tetrahydropyran-2-butyraldehyde the following procedure is used: An excess of dimethylsulfide is added at about −60° C. to the methanol solution of ozonide, and the mixture allowed to warm to room temperature over 5–6 hours. The solvent is then evaporated in vacuo and the residue extracted into ether. The ether solution is washed with water, dried over sodium sulfate and concentration to dryness in vacuo to give 2-methoxy-6-methyl tetrahydropyran - 2-butyraldehyde.

EXAMPLE 6

2-(δ-hydroxybutyl)-2-methoxy-6-methyl tetrahydropyran (VI); 1,7-dioxa-2-methyl-spiro[5:5]undecane The methanolic solution of ozonide obtained as in Example 5 is brought to about −20° C., and 9.45 g. of solid sodium borohydride is added slowly to it at a rate such that the temperature does not exceed 0° C. The mixture is then stirred for ½ hour at 0° C. and for 1½ hours at room temperature. Most of the methanol is then removed

11 by distillation at about 40° C. under vacuum. Water is added to the semi-solid residue and the resulting mixture extracted with ether. The ether extracts are combined, washed with water, dried over anhydrous sodium sulfate and finally evaporated to dryness to give 9.13 g. of 2-(δ-hydroxybutyl)-2-methoxy-6-methyl tetrahydropyran as a colorless liquid.

I.R.: $\lambda_{max.}^{film}$ 3.01μ

N.M.R. $(CDCl_3)\delta$ 3.46 (s., —O—$CH_3$); 2.45 (s. —O—H).

When the above product is treated for 15 minutes with dilute methanolic hydrochloric acid, it is quantitatively transformed to 1,7-dioxa - 2 - methyl-spiro[5:5]undecane. This latter substance is recovered by concentrating to dryness, extracting the residue with ether, washing the ether extract with sodium bicarbonate, filtering and finally concentrating the ether solution to dryness.

EXAMPLE 7

2-(δ-p-toluenesulfonyloxy)-2-methoxy-6-methyl-tetrahydropyran (VII)

To a stirred solution of 8.526 g. of 2-methoxy-2-(4'-hydroxybutyl)-6-methyl tetrahydropyran in 40 ml. of dry pyridine there is added at 0° C. 16.205 g. of purified p-toluenesulfonyl chloride under an atmosphere of nitrogen. The clear solution immediately becomes heterogenous due to the separation of pyridine hydrochloride. The reaction mixture is stirred for 17 hours at about 5° C. and then poured into an ice-water mixture containing 38.64 g. of sodium bicarbonate. The mixture is stirred for 1½ hours, then extracted with diethyl ether. The ether extracts are combined, washed with 5% aqueous sodium carbonate, dried over anhydrous sodium sulfate and evaporated to dryness at about 40° C. in vacuo. There is obtained a residue containing 12.945 g. of 2-(δ-p-toluenesulfonyloxy)-2-methoxy-6-methyl tetrahydropyran;

I.R.: $\lambda_{max.}^{film}$ 6.27, 7.83 and 8.48μ

The product, obtained as described above, is sometimes accompanied by minor amounts of the enol ether and hydroxy ketone forms; the latter two forms are converted to the tetrahydropyran form by treatment of the entire product with 1% methanolic hydrogen chloride.

EXAMPLE 8

2-(δ-bromobutyl)-2-methoxy-6-methyl tetrahydropyran (VIII)

A stirred solution of 9.368 g. of 2-(δ-p-toluenesulfonyloxy)-2-methoxy-6-methyl tetrahydropyran and 55 ml. of dry methanol containing 6.761 g. of sodium bromide is gently refluxed for 5 hours under an atmosphere of nitrogen. A fine precipitate of sodium bromide appears immediately after the refluxing is started; this redissolves in about one hour and thereafter crystalline sodium p-toluene sulfonate appears. After 5 hours the mixture is filtered and the filtrate concentrated in vacuo to dryness; the residue is dissolved in ether, filtered and evaporated to dryness to yield an oily material which is dissolved in 1% methanolic hydrogen bromide. The methanol solution is neutralized with solid sodium bicarbonate, concentrated to dryness in vacuo and the residue dissolved in ether. The ethereal solution is filtered and the filtrate then concentrated to dryness. There are obtained 7.173 g. of 2-(δ-bromobutyl) - 2 - methoxy - 6 - methyl tetrahydropyran; N.M.R. $(CDCl_3)$; δ 1.12

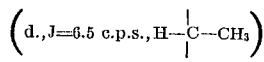

and 3.17 (s. —O—$CH_3$).

12

EXAMPLE 9

2-methoxy-6-methyl tetrahydropyran-2-butyl triphenyl phosphonium bromide (IX)

A mixture of 3.975 g. of 2-(δ-bromobutyl)-2-methoxy-6-methyl tetrahydropyran, 4.338 g. of triphenylphosphine and 30 ml. of dry methanol is heated at reflux for 20 hours under an atmosphere of nitrogen. At the end of this time most of the methanol is removed by evaporation at 40° C. under vacuum. To the resulting residue there is added dry benzene to precipitate the desired phosphonium salt. The benzene layer is decanted, and the residue washed with fresh benzene. The residue is then concentrated to a light yellow foam containing predominantly 2-methoxy-6-methyl tetrahydropyran - 2 - butyl triphenyl phosphonium bromide and a minor amount of open-ring hydroxy ketone form. In order to convert this hydroxy ketone form of the phosphonium bromide to the tetrahydropyran form, the material is treated with 30 ml. of 1% methanolic hydrogen bromide for 3 hours at room temperature. An ethereal solution of diazomethane is then added to decompose hydrobromic acid and the reaction mixture is then evaporated to dryness in vacuo to yield 2-methoxy - 6 - methyl tetrahydropyran-2-butyl triphenyl phosphonium bromide as a foam.

I.R.: $\lambda_{max.}^{CHCl_3}$ 6.3, 6.98, 8.98 and 14.45μ

EXAMPLE 10

1 - (3,5 - dimethoxy - 6 - carboxyphenyl) - 10 - hydroxy-1-undecen - 6 - one (X)—(Seco acid from zearalenone dimethyl ether)

A 2.35 molar solution of methylsulfinyl carbanion in dimethylsulfoxide is prepared in known manner from dimethyl sulfoxide and sodium hydride.

4.01 ml. of this 2.35 molar solution of methylsulfinyl carbanion in dimethyl sulfoxide is added to a stirred solution of 4.972 g. (0.00942 mole) of 2-methoxy-6-methyl tetrahydropyran-2-butyl triphenyl phsophonium bromide in 12 ml. of dry dimethyl sulfoxide. The resulting deep red solution is stirred for 10 minutes under $N_2$ at room temperature, during which time the corresponding phosphorane is formed. A solution of sodium-2-formyl-4,6-dimethoxy benzoate is prepared by adding 4.01 ml. of the 2.35 molar solution of methyl sulfinyl carbanion in dimethyl sulfoxide to 1.981 g. of 2-formyl-4,6-dimethoxy benzoic acid in 10 ml. of dimethyl sulfoxide. This latter solution of benzoate salt is added with stirring to the above solution of phosphorane. The resulting reaction mixture is stirred at room temperature for 15 hours. It is then diluted with about an equal volume of water and extracted with ether. The ether layer is removed; the aqueous alkaline layer is made just acidic with dilute aqueous hydrochloric acid and extracted with fresh ether. This latter ethereal extract is extracted with 5% aqueous sodium bicarbonate and the resulting aqueous alkaline solution made just acidic with dilute hydrochloric acid. This aqueous acidic solution is extracted with ether. This latter ether extract is washed with a saturated aqueous solution of sodium chloride, dried over anhydrous sodium sulfate and finally evaporated to dryness in vacuo to afford a residue consisting of 1.9 g. of 1-(3,5-dimethoxy-6-carboxyphenyl)-10-hydroxy-1-undecen-6-one;

I.R.: $\lambda_{max.}^{CHCl_3}$ 2.8–4.3, 5.81, 5.88, 6.24 and 10.31μ

As determined by the N.M.R. spectrum, this product is a mixture of geometrical isomers containing predominantly the trans-isomer.

EXAMPLE 11 d,l-Zearalenone dimethyl ether (XI)

20 ml. of trifluoroacetic anhydride is added dropwise over 1 hour to a stirred cold (10° C.) solution of 10.0 g. of racemic seco acid, i.e., 1-(3,5-dimethoxy-6-carboxyphenyl)-10-hydroxy-1-undecen-6-one in 2800 ml. of benzene. The addition is carried out in a nitrogen atmosphere. The cooling bath is then removed and the mixture stirred for an additional hour. It is then cooled to 10° C. and 5% aqueous sodium hydroxide is added (about 200 ml.) with stirring until the mixture is basic. The layers are separated, the aqueous layer is extracted twice with benzene, and the combined benzene layer and extracts washed twice with water, once with saturated sodium chloride solution, dried over magnesium sulfate and concentrated to dryness under vacuum. The residue is dissolved in chloroform and chromatographed on about 150 g. of silica gel H. The column is eluted with chloroform containing 4% acetone. The fractions containing the d,l-zearalenone dimethyl ether (as determined by thin layer chromatography) are combined and concentrated to dryness in vacuo. The residue thus obtained is crystallized from 9:1 ether-acetone to give pure d,l-zearalenone dimethyl ether, M.P. 124–126° C.

EXAMPLE 12 d,l-Zearalenone (XII)

(A) To a stirred solution of 120 mg. of d,l-zearalenone dimethyl ether in 1.2 ml. of methylene chloride under nitrogen at 0° C. there is added a cooled (0° C.) solution of 0.5 ml. of boron tribromide in 0.8 ml. of methylene chloride. The cooling bath is removed and after 5 minutes the reaction mixture is concentrated to dryness under water pump vacuum (bath temperature 30° C.). The resulting solid residue is triturated with 5 ml. of water and the precipitate filtered, washed with water and dried under vacuum to give 121 mg. of crude d,l-zearalenone. The product is purified by preparative thin layer chromatography on silica gel G coated glass plates using chloroform-5% acetonitrile as the developing solvent. The product is removed from the glass plates, dissolved in a minimum volume of acetone, and hexane added to the acetone solution until crystallization begins. The crystalline product is filtered off and dried to give pure d,l-zearalenone, M.P. 187–189° C.

(B) A mixture of 500 mg. of d,l-zearalenone dimethyl ether and 5.0 g. of pyridine hydrochloride is held under nitrogen for 1 hour at 180–185° C. The mixture is then cooled, dilute aqueous hydrochloric acid added to it, and the whole extracted with 2× 10 ml. of methylene chloride. The methylene chloride extracts are combined, washed with saturated aqueous sodium chloride, dried over sodium sulfate and finally concentrated in vacuo to dryness. The residue is purified by thin layer chromatography and crystallization from acetone-hexane according to the procedure set forth in part (A) above.

EXAMPLE 13 d,l-Zearalenone-4-monomethyl ether (XII)

To a stirred solution of 480 mg. of d,l-zearalenone dimethyl ether in 5 ml. of methylene chloride under nitrogen at 0° C. there is added a cooled (0° C.) solution of 2 ml. of boron tribromide in 2 ml. of methylene chloride. The reaction mixture is immediately poured onto 50 ml. of crushed ice with stirring. The mixture is made basic with potassium bicarbonate and extracted with methylene chloride. The latter extract is washed with saturated aqueous sodium chloride, dried over magnesium sulfate and taken to dryness under vacuum. Thin layer chromatography (silica gel G-chloroform-5% acetonitrile) shows the presence of a minor amount of d,l-zearalenone and a major amount of d,l-zearalenone-4-monomethyl ether. The monomethyl ether is isolated and purified by preparative thin layer chromatography (as described in Example 12) to afford substantially pure material.

EXAMPLE 14

1-(3,5-dimethoxy-6-carboxyphenyl)-10-hydroxy-1-undecen-6-one (A) To a stirred solution of 10 g. of zearalenone dimethyl ether [2 - (-10 - hydroxy-6-oxo-1-undecenyl)-4,6-dimethoxy benzoic acid μ-lactone (II)] in 100 ml. of dimethylsulfoxide maintained under nitrogen there is added dropwise 60 ml. of 20% aqueous sodium hydroxide. During the addition the solution turns red and the flask is heated until the mixture refluxes gently. (Internal temperature about 120° C.). After two hours of gentle reflux the solution is cooled to 10–15° C. and added with stirring to 300 ml. of cold water (10–15° C.). The mixture is made acidic with 2.5 N hydrochloric acid and extracted 4 times with chloroform. The combined chloroform extracts are in turn extracted with dilute aqueous potassium bicarbonate. The latter aqueous extract is washed once with chloroform and acidified with dilute hydrochloric acid. The mixture is extracted with chloroform, the latter chloroform extract washed with saturated aqueous sodium chloride, dried over sodium sulfate and concentrated to dryness under vacuum, d,l-1-(3,5 - dimethoxy-6-carboxyphenyl)-10-hydroxy-1-undecen-6-one is obtained as a pale yellow viscous oil.

I.R.: $\lambda_{max.}^{CHCl_3}$ 2.8–4.3, 5.81, 5.88, 6.24 and 10.31μ

(B) Diazomethane is generated by the procedure of DeBoer [Rec. Trav. Chem. 73 229 (1954)] and under a gentle nitrogen stream excess diazomethane is passed into a solution of 4.0 g. of d,l-1-(3,5-dimethoxy-6-carboxyphenyl)-10-hydroxy-1-undecen-6-one in 50 ml. of tetrahydrofuran. After 30 minutes excess diazomethane and solvent are removed under vacuum to give a residue of d,l-1-(3,5-dimethoxy - 6 - carbomethoxyphenyl) - 10 - hydroxy-1-undecen-6-one.

Any departure from the above description which conforms to the present invention is intended to be included within the scope of the claims.

We claim:

1. A process for preparing d,l-zearalenone which comprises treating a compound of the formula:

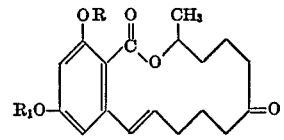

wherein R and $R_1$ are lower alkyl or benzyl, with boron tribromide or pyridine hydrochloride.

2. The process of claim 1 wherein R and $R_1$ are methyl, and said compound is treated with boron tribromide.

3. A process for preparing d,l-zearalenone ethers having the structural formula

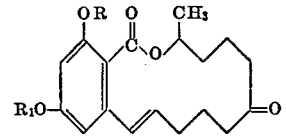

wherein R is hydrogen and $R_1$ represents lower alkyl or benzyl, that comprises contacting a compound of the formula:

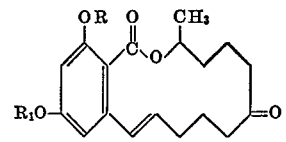

where R and $R_1$ are lower alkyl or benzyl with boron tribromide and terminating the reaction promptly after the reactants are brought together.

4. The process of claim 3 wherein R and $R_1$ are methyl.

5. A process for preparing d,l-zearalenone ethers having the structural formula

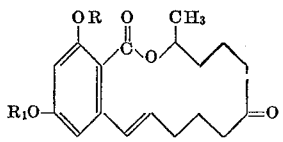

wherein R and $R_1$ are lower alkyl or benzyl which comprises treating a compound of the formula

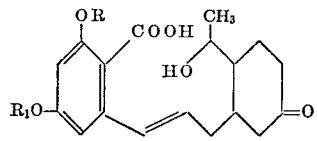

wherein R and $R_1$ are as defined above, with trifluoroacetic anhydride.

6. The process of claim 5 wherein R and $R_1$ are methyl.

References Cited
UNITED STATES PATENTS

| | | | |
|---|---|---|---|
| 3,239,342 | 3/1966 | Hodge et al. | 260—343.2 X |
| 3,535,343 | 10/1970 | Cross et al. | 260—343.2 |
| 3,551,454 | 12/1970 | Taub et al. | 260—343.2 |
| 3,551,455 | 12/1970 | Girotra et al. | 260—343.2 |
| 3,562,313 | 2/1971 | Cross et al. | 260—343.2 X |
| 3,373,035 | 3/1968 | Martin | 260—343.2 X |
| 3,574,235 | 4/1971 | Young | 260—343.2 |
| 3,585,216 | 6/1971 | Cross et al. | 260—343.2 X |

JOHN M. FORD, Primary Examiner